(12) United States Patent
Lee et al.

(10) Patent No.: US 11,673,369 B2
(45) Date of Patent: Jun. 13, 2023

(54) POST-FORMING METHOD OF CARBON-FIBER-REINFORCED THERMOPLASTIC COMPOSITE USING STITCHING TECHNIQUE

(71) Applicant: KOREA INSTITUTE OF SCIENCE AND TECHNOLOGY, Seoul (KR)

(72) Inventors: Min Wook Lee, Jeollabuk-do (KR); Yongtak Kim, Jeollabuk-do (KR); Ki Hyun Ryu, Jeollabuk-do (KR); Wonjin Na, Jeollabuk-do (KR); Jaesang Yu, Jeollabuk-do (KR); Minkook Kim, Jeollabuk-do (KR); Cheol-Min Yang, Jeollabuk-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 17/211,828

(22) Filed: Mar. 25, 2021

(65) Prior Publication Data
US 2021/0379867 A1 Dec. 9, 2021

(30) Foreign Application Priority Data
Jun. 5, 2020 (KR) .......................... 10-2020-0068299

(51) Int. Cl.
*B32B 7/09* (2019.01)
*B32B 5/02* (2006.01)
(Continued)

(52) U.S. Cl.
CPC .................. *B32B 7/09* (2019.01); *B32B 5/02* (2013.01); *B32B 27/12* (2013.01); *B32B 27/302* (2013.01);
(Continued)

(58) Field of Classification Search
CPC .................................... B32B 7/08; B32B 7/09
See application file for complete search history.

(56) References Cited

U.S. PATENT DOCUMENTS

| 2010/0021682 A1* | 1/2010 | Liang ................ D04H 1/4374 427/322 |
| 2017/0028601 A1* | 2/2017 | Soni ...................... B29B 11/04 |

(Continued)

FOREIGN PATENT DOCUMENTS

| JP | 2003-80607 A | 3/2003 |
| KR | 100630427 B1 | 10/2006 |

(Continued)

OTHER PUBLICATIONS

Troughton, Handbook of Plastics Joining, 2008, William Andrew, 2nd edition, pp. 105-106 (Year: 2008).*
(Continued)

*Primary Examiner* — Zachary M Davis
(74) *Attorney, Agent, or Firm* — Cantor Colburn LLP

(57) ABSTRACT

The present disclosure relates to a carbon-fiber-reinforced composite including a plurality of stacked thermoplastic layers, and a plurality of carbon fiber reinforcing layers interposed between the thermoplastic layers, wherein the carbon-fiber-reinforced composite further comprises a stitching part stitched with an upper yarn and a lower yarn from outside of the thermoplastic layers at a folding location of the carbon-fiber-reinforced composite.

20 Claims, 13 Drawing Sheets

(51) Int. Cl.
  *B32B 27/32* (2006.01)
  *B32B 27/36* (2006.01)
  *B32B 27/34* (2006.01)
  *B32B 27/30* (2006.01)
  *B32B 27/12* (2006.01)

(52) U.S. Cl.
  CPC .............. *B32B 27/32* (2013.01); *B32B 27/34* (2013.01); *B32B 27/36* (2013.01); *B32B 27/365* (2013.01); *B32B 2262/0253* (2013.01); *B32B 2262/0269* (2013.01); *B32B 2262/101* (2013.01); *B32B 2262/103* (2013.01); *B32B 2262/106* (2013.01)

(56) References Cited

U.S. PATENT DOCUMENTS

2018/0079165 A1* 3/2018 Nagasaka .............. B32B 27/32
2020/0139651 A1* 5/2020 Guha ..................... B29C 70/42

FOREIGN PATENT DOCUMENTS

| KR | 1020150078805 A | 7/2015 |
| KR | 1020180080218 A | 7/2018 |
| KR | 101987827 B1 | 6/2019 |
| KR | 102100356 B1 | 4/2020 |
| WO | 2017079277 A1 | 5/2017 |

OTHER PUBLICATIONS

Machine Translation of JP 2003-080607 (Year: 2003).*
P. Sreekanth Reddy et al., "Improving the Delamination Resistance in Basalt Fibre Epoxy Composite Laminates by Stitching," International Journal of Engineering Research & Technology, 2019, pp. 102-111, vol. 8, Issue 11.
Nisrin Abdelal, "Electromagnetic interference shielding of stitched carbon fiber composites," Journal of Industrial Textiles, 2020, pp. 773-790, vol. 49, No. 6.
Akira Todoroki et al., "Self-deployable Space Structure using Partially Flexible CFRP with SMA Wires," Journal of Intelligent Material Systems and Structures, Aug. 2009, pp. 1415-1424, vol. 20.
Antonio Alessandro Deleo et al., "Composite Origami: Foldable Structures Based on Tachi-Miura-Polyhedron Origami Technique," Society for the Advancement of Material and Process Engineering, 2018.
Kazuya Saito et al., "Manufacture of Arbitrary Cross-Section Composite Honeycomb Cores Based on Origami Techniques," Journal of Mechanical Design, May 2014, 9 pages, vol. 136, No. 051011.

* cited by examiner

POST-FORMING METHOD OF CARBON-FIBER-REINFORCED THERMOPLASTIC COMPOSITE USING STITCHING TECHNIQUE

CROSS-REFERENCE TO RELATED APPLICATION

This application claims priority to Korean Patent Application No. 10-2020-0068299, filed on Jun. 5, 2020, and all the benefits accruing therefrom under 35 U.S.C. § 119, the contents of which in its entirety are herein incorporated by reference.

TECHNICAL FIELD

The present disclosure relates to a carbon-fiber-reinforced composite that is freely foldable like origami.

BACKGROUND ART

The state-of-the-art materials, carbon-fiber-reinforced composites, have lower weight and higher strength characteristics at least 4 times than steel and at least 3 times than aluminum, and they are used in a variety of fields such as automotive and aviation fields.

However, despite the superior mechanical properties of the carbon-fiber-reinforced composites, due to the difficulties in processing, there are limitations in manufacturing the composites into complex shapes or re-forming the shape of the composites once manufactured, and such limitations are now thought as obstacles to the use and economical efficiency of the carbon-fiber-reinforced composites.

In particular, when the typical carbon-fiber-reinforced composites are used to manufacture large structure, larger forming equipment and molds are necessary, and for example, large and heavy equipment is used for structures of complex shapes, or soft materials such as rubber are used as the bending part, which greatly reduces the entire strength.

Accordingly, it is almost impossible to manufacture the carbon-fiber-reinforced composites at low costs.

DISCLOSURE

Technical Problem

To solve the technical and economical problems of the existing carbon-fiber-reinforced composites as described above, it is necessary to develop more simple and effective techniques for forming carbon-fiber-reinforced composites with the reduced process costs and the increased economical efficiency.

Technical Solution

To achieve the above-described technical object, the present disclosure provides a carbon-fiber-reinforced composite including a plurality of stacked thermoplastic layers, and a plurality of carbon fiber reinforcing layers interposed between the thermoplastic layers, wherein the carbon-fiber-reinforced composite further includes a stitching part stitched with an upper yarn and a lower yarn from outside of the thermoplastic layers at a folding location of the carbon-fiber-reinforced composite.

Additionally, the upper yarn and the lower yarn of the present disclosure may use a metallic fiber, and the metallic fiber may include a fiber made of at least one selected from the group consisting of copper, aluminum, gold, silver, indium, stainless steel, nickel, carbon, carbon nano tube (CNT) and a combination thereof.

Additionally, when an electric current is applied to the upper yarn and the lower yarn, the stitching part of the present disclosure is heated, causing the folding of the carbon-fiber-reinforced composite.

Additionally, in the present disclosure, selectively, the upper yarn may include a fiber made of at least one selected from the group consisting of aramid, glass, polyethylene and a combination thereof, and the lower yarn may include a fiber made of at least one selected from the group consisting of copper, aluminum, gold, silver, indium, stainless steel, nickel, carbon, carbon nano tube (CNT) and a combination thereof.

Additionally, the thermoplastic layer of the present disclosure may include at least one selected from the group consisting of polypropylene (PP), polyethylene (PE), polyethyleneterephthalate (PET), polybutyleneterephthalate (PBT), polyamide (PA), polyacrylonitrile-butadiene-styrene copolymer (ABS), polycarbonate (PC)-ABS alloy resin and a combination thereof.

Additionally, the stitching part of the present disclosure may be linearly positioned in the carbon-fiber-reinforced composite.

Advantageous Effects

The present disclosure provides new carbon-fiber reinforced composites having the stitching part through which the existing planar carbon-fiber-reinforced composites are re-shaped into complex 3-dimensional structures having stiff properties.

In addition, the present disclosure manufactures carbon-fiber-reinforced composites of complex shapes without using large and heavy equipment, and has a wide range of applications requiring composite materials for structures.

BEST MODE

Hereinafter, embodiments of a carbon-fiber-reinforced composite 100 according to an embodiment of the present disclosure and a folding test using the same will be described through the preferred embodiments of the present disclosure with reference to the accompanying drawings.

Prior to the description, unless the context clearly indicates otherwise, the term "comprises" when used in this specification, specifies the presence of stated elements, but does not preclude the presence or addition of one or more other elements.

Additionally, the embodiments of the present disclosure are described with reference to the accompanying drawings, but this is described for illustration purposes, and the technical spirit of the present disclosure and its elements and operations are not limited thereto.

Figure 1:
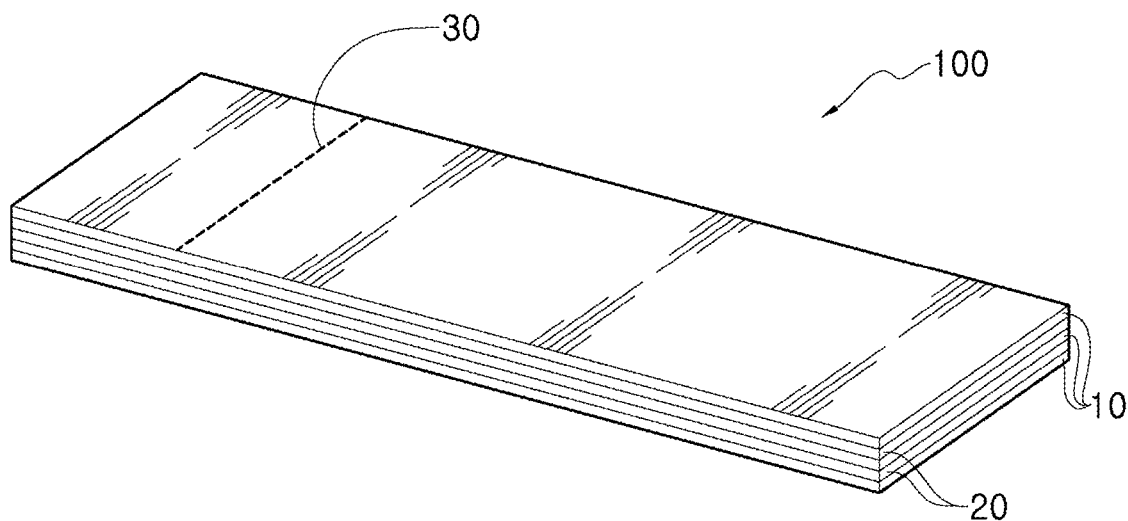
FIG. 1 is a perspective view schematically showing a carbon-fiber-reinforced composite according to an embodiment of the present disclosure.

FIG. 1 is a perspective view schematically showing the carbon-fiber-reinforced composite 100 according to an embodiment of the present disclosure.

As shown in FIG. 1, the carbon-fiber-reinforced composite 100 according to an embodiment of the present disclosure includes a plurality of stacked thermoplastic layers 10, and a plurality of carbon fiber reinforcing layers 20 interposed between the thermoplastic layers 10.

In detail, the thermoplastic layer 10 may include at least one selected from the group consisting of polypropylene (PP), polyethylene (PE), polyethyleneterephthalate (PET), polybutyleneterephthalate (PBT), polyimide (PA), polyacrylonitrile-butadiene-styrene copolymer (ABS), polycarbonate (PC)-ABS alloy resin and a combination thereof.

Additionally, the carbon-fiber-reinforced composite 100 may include a stitching part 30 stitched with an upper yarn 31 and a lower yarn 32 from the outside of the thermoplastic layer 10 at a target folding location shown as a dashed line, and the stitching part 30 may be linearly positioned in the carbon-fiber-reinforced composite 100.

Meanwhile, when electricity is applied to the stitching part 30, heat is generated (Joule heating) by electrical resistance of the upper yarn 31 and the lower yarn 32, and the heat melts the thermoplastic layer 10, reducing the strength, and accordingly, when a force is applied from the outside, folding is enabled along the linearly positioned stitching part 30.

The folding of the carbon-fiber-reinforced composite 100 according to an embodiment of the present disclosure will be described in more detail through the following embodiments.

Figure 2:
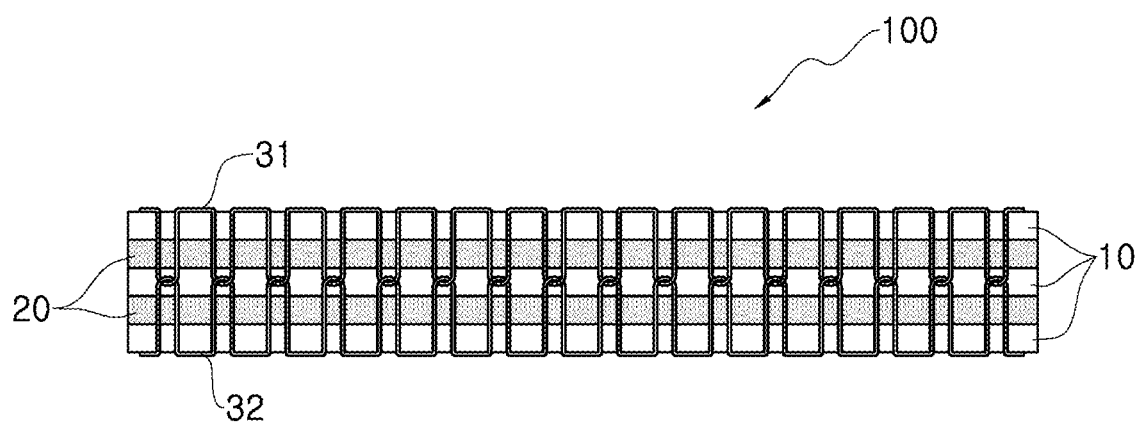
FIG. 2 schematically shows a cross section of a carbon-fiber-reinforced composite according to an embodiment of the present disclosure.

FIG. 2 schematically shows a cross section of the carbon-fiber-reinforced composite 100 according to an embodiment of the present disclosure.

As shown in FIG. 2, the carbon-fiber-reinforced composite 100 of the present disclosure has the stitching part stitched through the upper yarn 31 and the lower yarn 32.

As an embodiment, in an embodiment of the present disclosure, the upper yarn 31 and the lower yarn 32 may use a metallic fiber, and the metallic fiber may include a fiber made of at least one selected from the group consisting of copper, aluminum, gold, silver, indium, stainless steel, nickel, carbon, carbon nano tube (CNT) and a combination thereof.

Figure 3:
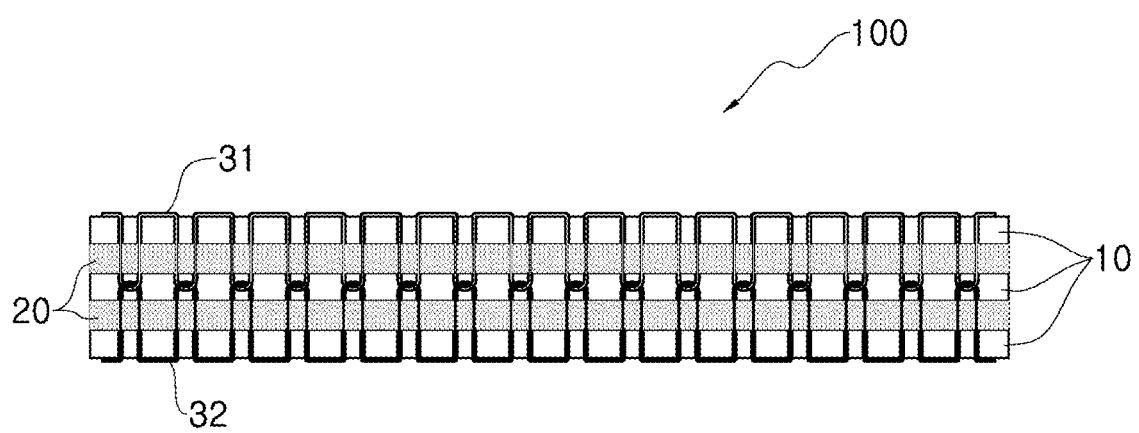
FIG. 3 schematically shows a cross section of a carbon-fiber-reinforced composite according to another embodiment of the present disclosure.

FIG. 3 schematically shows a cross section of the carbon-fiber-reinforced composite 100 according to another embodiment of the present disclosure.

As shown in FIG. 3, as another embodiment, the carbon-fiber-reinforced composite 100 of the present disclosure may use fibers of different materials for the upper yarn 31 and the lower yarn 32.

For example, the upper yarn 31 may include a fiber made of at least one selected from the group consisting of aramid, glass, polyethylene and a combination thereof, and the lower yarn 32 may include a fiber made of at least one selected from the group consisting of copper, aluminum, gold, silver, indium, stainless steel, nickel, carbon, carbon nano tube (CNT) and a combination thereof.

Figure 4A:
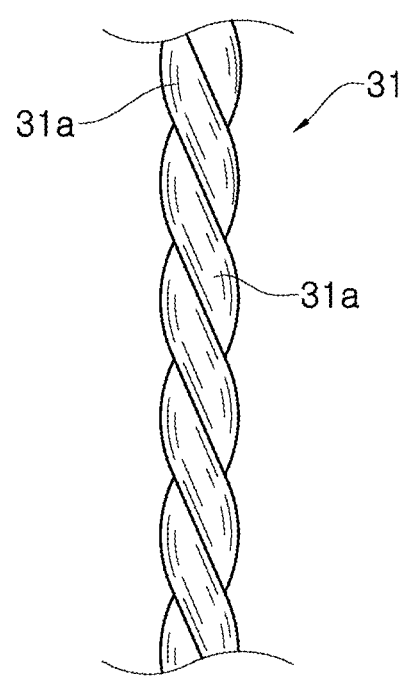
FIG. 4A and FIG. 4B schematically show a fiber of a carbon-fiber-reinforced composite according to embodiments of the present disclosure.
Figure 4B:
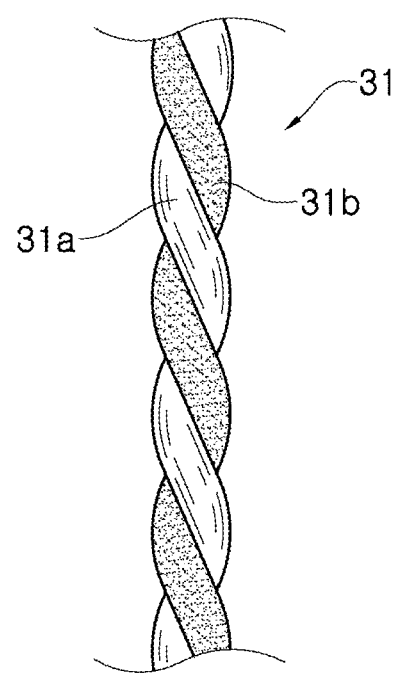

FIG. 4A and FIG. 4B schematically show the fiber of the carbon-fiber-reinforced composite 100 according to embodiments of the present disclosure.

For example, the fiber according to an embodiment of the present disclosure may use a twisted yarn made by twisting two or more strands of yarn to combine together, and for example, as shown in FIG. 4A, the fiber 31 may be formed by combining yarns 31a of the same type of material together, and as shown in FIG. 4B, the fiber 31 may be formed by combining yarns 31a, 31b of different types of materials together.

Figure 5:
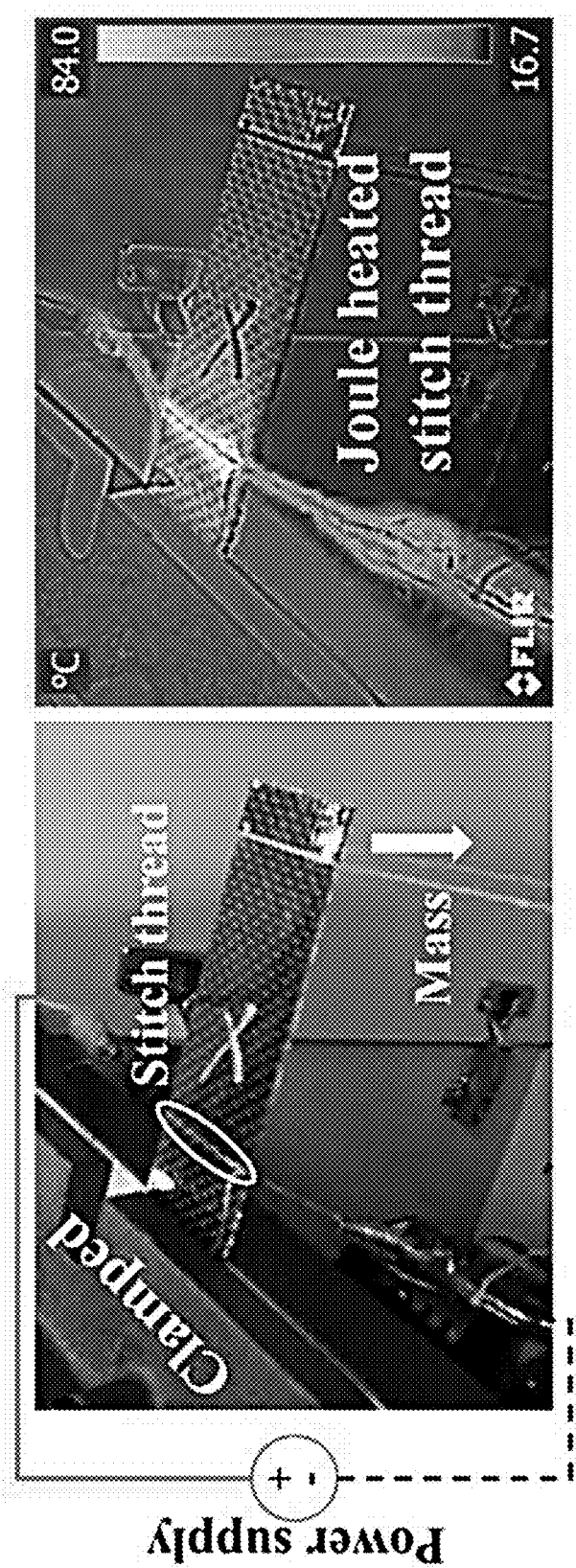
FIG. 5 is a photographic image showing a folding test of a carbon-fiber-reinforced composite according to an embodiment of the present disclosure.
Figure 6:
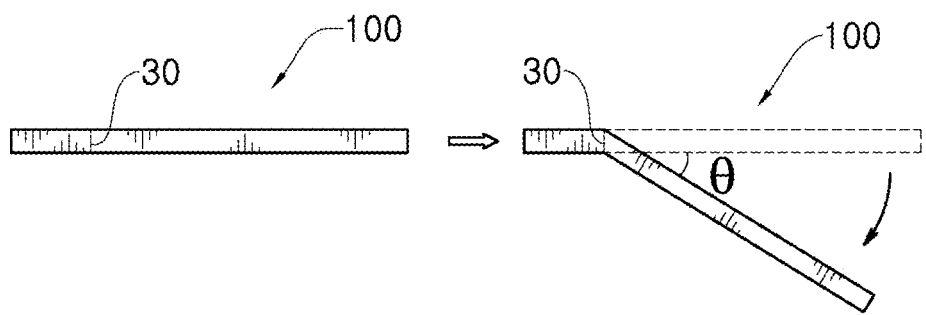
FIG. 6 is a conceptual diagram schematically showing the folding test of FIG. 5.

FIG. 5 is a photographic image showing a folding test of the carbon-fiber-reinforced composite 100 according to an embodiment of the present disclosure, and FIG. 6 is a conceptual diagram schematically showing the folding test of FIG. 5.

Before performing the folding test shown in FIG. 5, the carbon-fiber-reinforced composite 100 as described below is manufactured as an embodiment.

A carbon fiber reinforcing layer 20 uses a plain-woven carbon fiber sheet, and a carbon thermoplastic layer 10 uses a polycarbonate (PC) film as the reinforcement and matrix materials respectively. Additionally, the upper yarn 31 uses an aramid fiber, and the lower yarn 32 uses a stainless steel-aramid twisted fiber.

As shown in FIGS. 5 and 6, the temperature of the fiber of the stitching part 30 is controlled by changing the electric current applied using DC power, and the temperature distribution is measured using an infrared camera. The maximum folding degree $\theta_{max}$ and saturated time $t_{sat}$ refer to the time required to reach 90% of the maximum folding degree, and is measured at different Joule heating temperatures.

As shown in FIG. 5, one end of the specimen is pulled down by a constant mass hanging at the end of the specimen while the other side is clamped, and the onset temperature is 150° C. at which the specimen starts to bend by the mass of 88.6 g.

Figure 7:
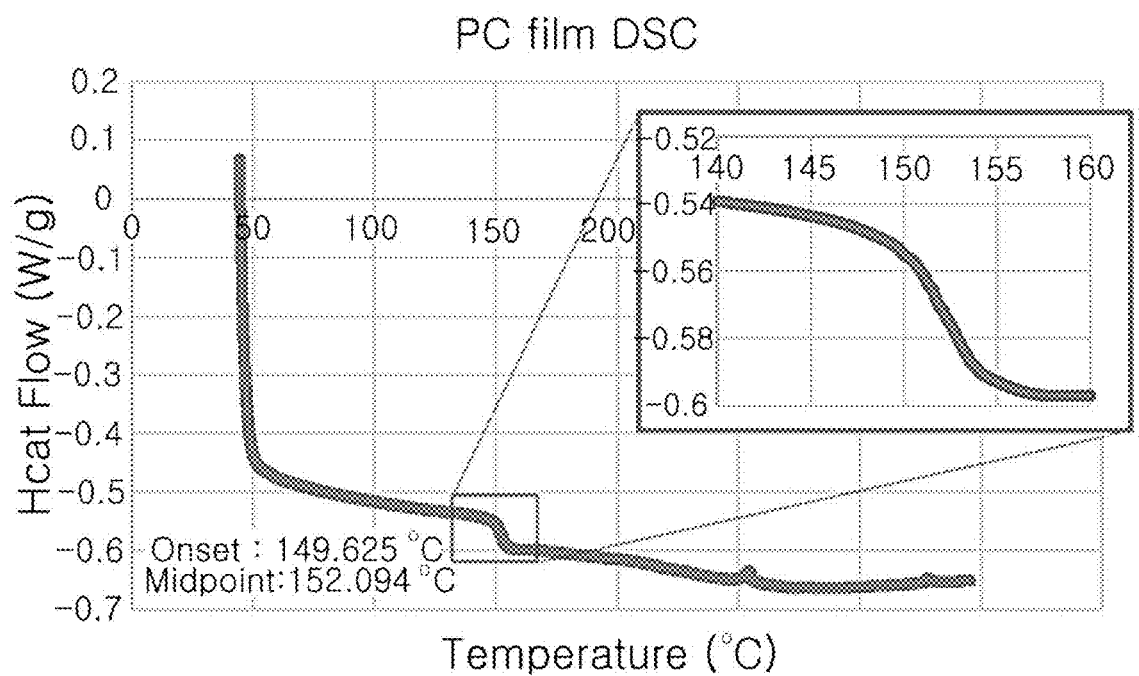
FIG. 7 is a graph showing a thermal analysis of a thermoplastic layer of a carbon-fiber-reinforced composite according to an embodiment of the present disclosure.
Figure 8A:
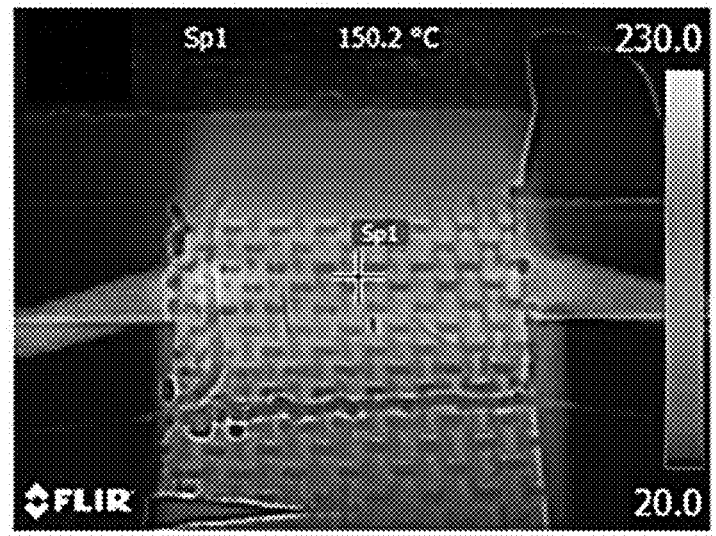
FIG. 8A to FIG. 8D are infrared (IR) images of thermal distribution of a stitching part of a carbon-fiber-reinforced composite according to an embodiment of the present disclosure.
Figure 8B:
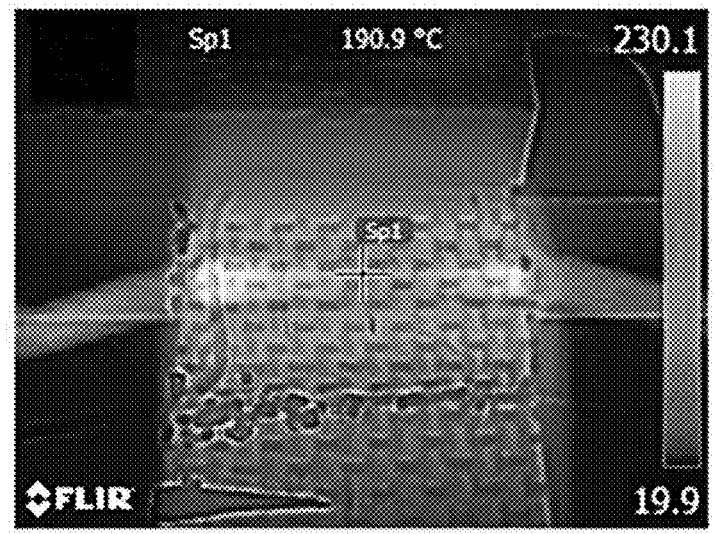
Figure 8C:
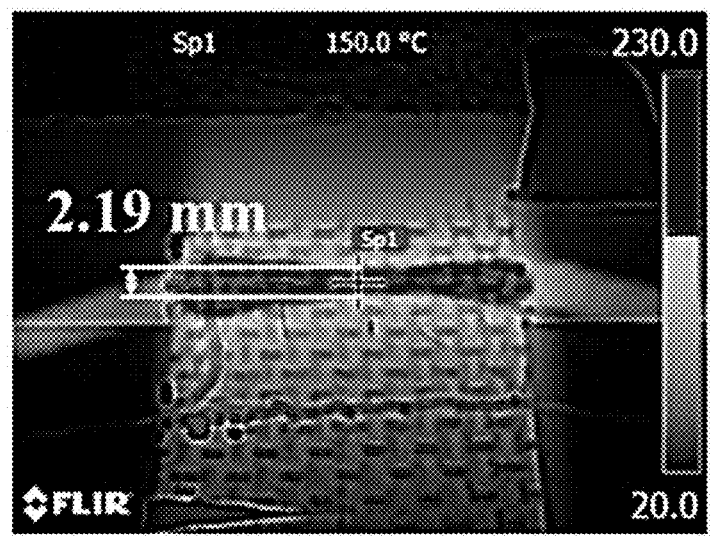
Figure 8D:
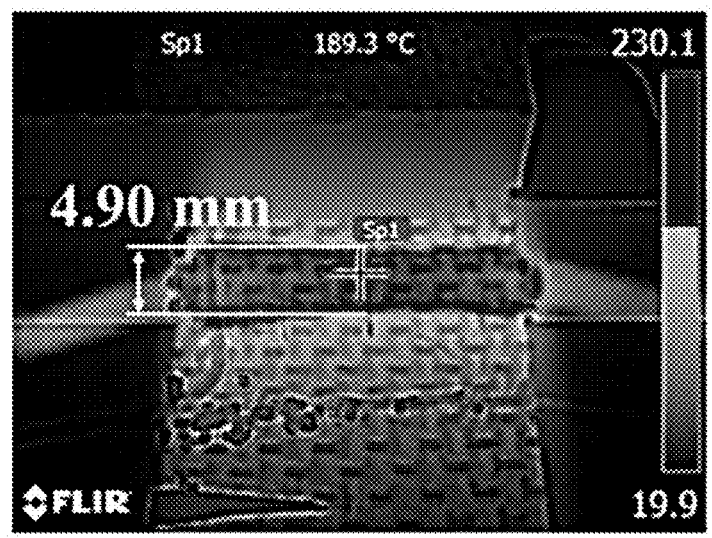

FIG. 7 is a graph showing a thermal analysis of the thermoplastic layer 20 of the carbon-fiber-reinforced composite 100 according to an embodiment of the present disclosure.

The Joule heating temperature of the PC film is set above 150° C., which is the glass transition temperature Tg of the PC film. As shown in FIG. 7, the onset temperature of the PC film is 149.6° C., and after the electric current is continuously applied, there is no significant change in thermal analysis until 350° C., and thus the applied temperature of the folding test is fixed at 150 to 170° C.

FIG. 8A to FIG. 8D are infrared (IR) images of thermal distribution of the stitching part 30 of the carbon-fiber-reinforced composite 100 according to an embodiment of the present disclosure.

It can be seen that the heating temperature of the stitching part is set to 150° C. at 13.0±1.0 V and 1.000±0.1 A, and as shown in FIG. 8A to FIG. 8D, the contour plot is uniform around the stitching part 30, but deviates up to 20 to 40° C. at the end of the specimen. Presumably, it is because the interfacial resistance of the stitch fiber greatly increases when the stitching part 30 is directly exposed to the outside air.

As shown in FIG. 8A to FIG. 8D, the effective heating widths (T>149° C., yellow contour area) are observed to be 2.19 and 4.90 mm at the set temperature of 150 and 190° C. respectively. That is, it can be seen that the width of the stitching part 30 of 2.19 mm or more is necessary for effective specimen folding, FIG. 9 is a graph showing the maximum folding degree and saturation time in the folding test of the carbon-fiber-reinforced composite 100 according to an embodiment of the present disclosure.

When the heated stitching part 30 reaches the target temperature, it is held for an additional 1 min to stabilize before the folding test is conducted. The maximum folding degree θmax and saturation time measured from video images are shown in FIG. 9.

Figure 9:
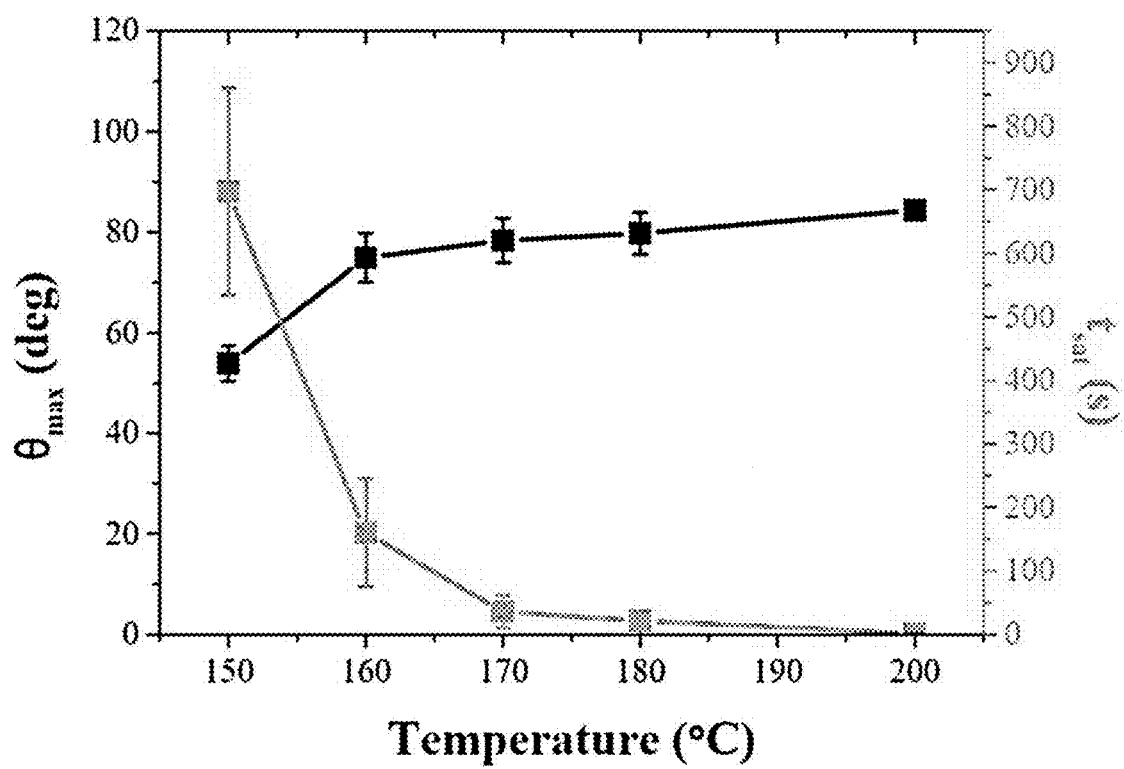
FIG. 9 is a graph showing the maximum folding degree and saturation time in a folding test of a carbon-fiber-reinforced composite according to an embodiment of the present disclosure.

As shown in FIG. 9, it can be seen that the maximum folding degree reaches 80±3° at 160° C. and stays relatively constant until 200° C. Additionally, it can be seen that the saturation time, also known as the folding speed, drops sharply from 700 sec to 35 sec.

This demonstrates successful local softening of the thermoplastic layer 10 by heating the stitching part 30 of the carbon-fiber-reinforced composite 100 according to an embodiment of the present disclosure.

Figure 10A:
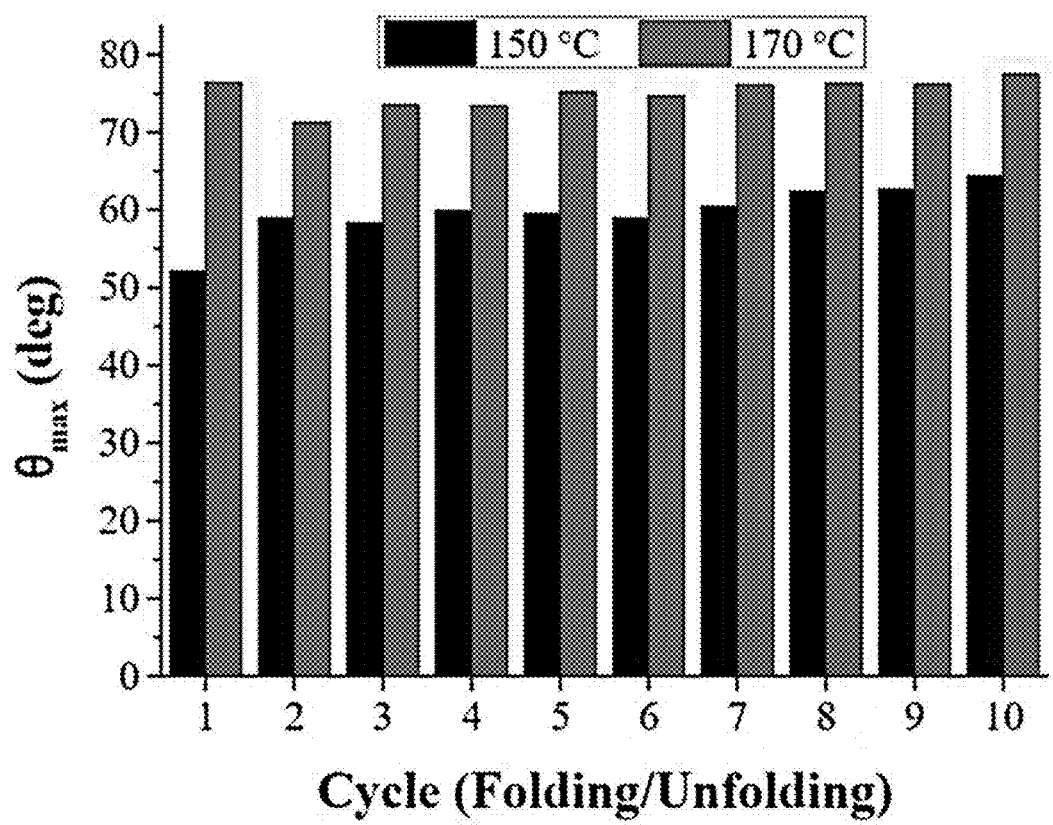
FIG. 10A and FIG. 10B are graphs showing a change in folding angle vs a temperature difference in repeated folding tests of a carbon-fiber-reinforced composite according to an embodiment of the present disclosure.
Figure 10B:
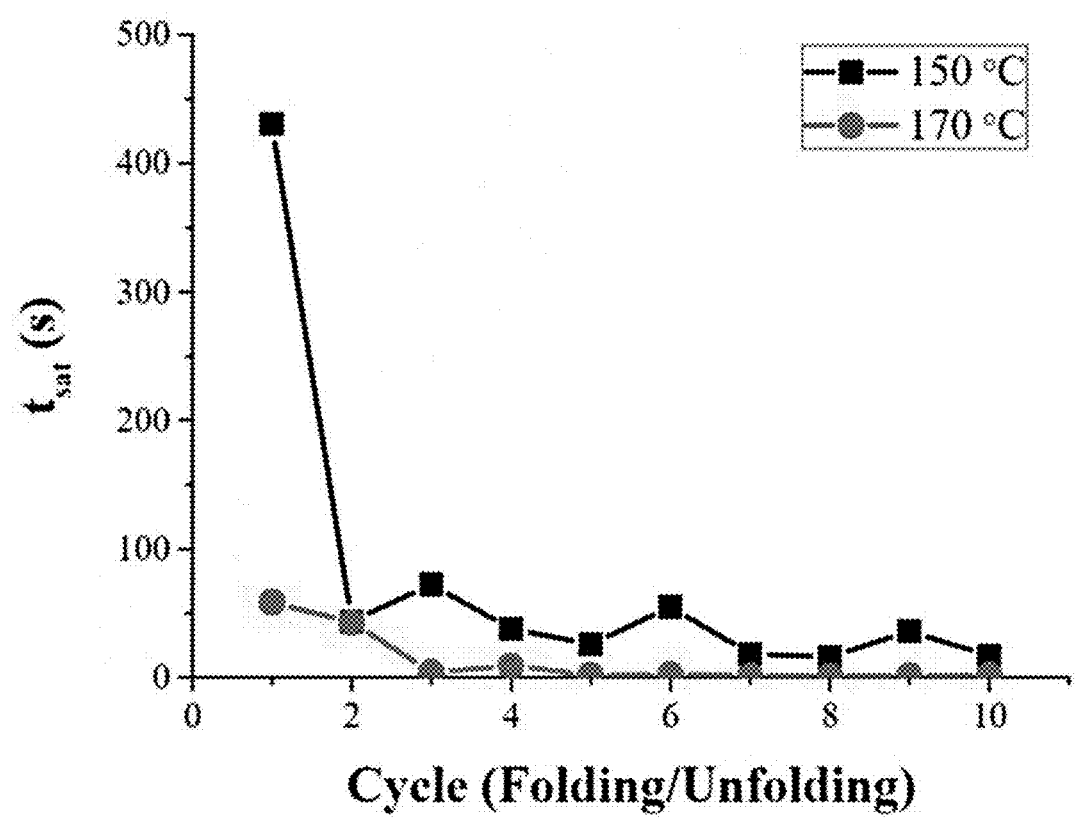

FIG. 10A and FIG. 10B are graphs showing a change in folding angle vs a temperature difference in repeated folding tests of the carbon-fiber-reinforced composite 100 according to an embodiment of the present disclosure.

As shown in FIG. 10A, it can be seen that as the folding and unfolding process is repeated, it remains considerably similar for 10 cycles, particularly, after the second cycle. Additionally, it can be seen that at the low temperature of 150° C., the maximum folding degree θmax is 52° at the first fold, but then is almost constant at approximately 60±2° until the tenth cycle. It is presumed that the thermoplastic layer is loosened, and in general, it is because polymer chains of thermoplastics may be loosened in the molten (soften or glass transition) resin, and partially broken polymer chains in the matrix enable more flexibility.

This phenomenon is found in the result of reduction in the saturation time from 420 to 50 sec in the second cycle of FIG. 10B, and it can be seen that the maximum folding degree θmax constantly reaches 75±3° after the third cycle at 170° C. That is, it represents that as the temperature is higher, flexibility is improved, and as a result, the maximum folding degree θmax increases and the saturation time $t_{sat}$ reduces. That is, it can be seen through the folding test of FIG. 10A and FIG. 10B that constant behaviors are observed during repeated folding tests.

Figure 11A:
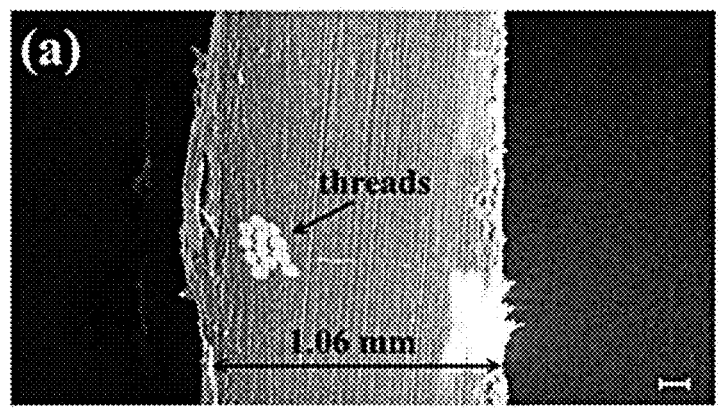
FIG. 11A to FIG. 11D show scanning electron microscope (SEM) imaging results of a carbon-fiber-reinforced composite according to an embodiment of the present disclosure.
Figure 11B:
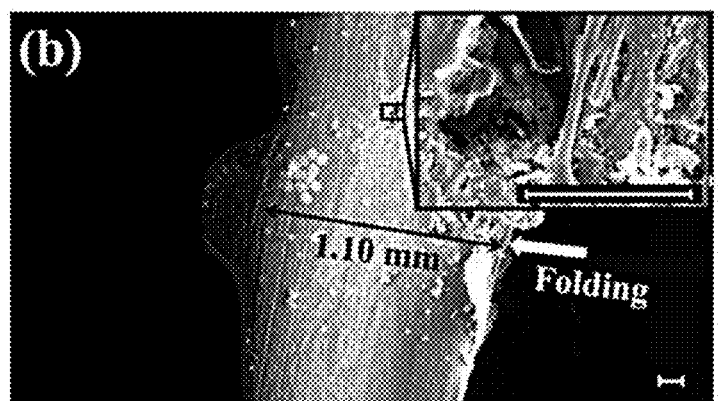
Figure 11C:
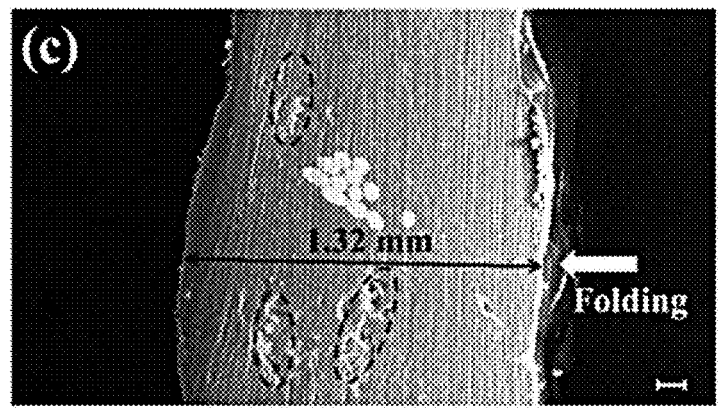
Figure 11D:
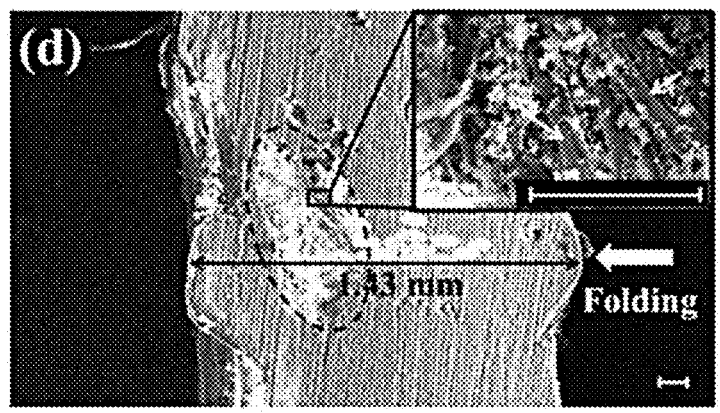

FIG. 11A to FIG. 11D show scanning electron microscope (SEM) imaging results of the carbon-fiber-reinforced composite 100 according to an embodiment of the present disclosure; FIG. 11A shows the specimen before the folding test, FIG. 11B shows the specimen after the folding test is performed once, FIG. 11C shows the specimen after the folding test is performed 5 times, and FIG. 11D shows the specimen after the folding test is performed 10 times.

As shown in FIG. 11A, it can be seen that the composite 100 is well impregnated with the CF film around the carbon fiber reinforcing layer and the stitched fiber. The stitched sample before folding is a clean surface without any thicker as the folding number increases. Voids are left after unfolding of the specimen because the bent plies of the carbon fiber reinforcing layer still buckle.

FIG. 11B shows that the carbon fiber reinforcing layer bonds well with the matrix, and the matrix is still intact. In contrast, FIG. 11D shows the carbon fiber reinforcing layer not bonded with the matrix, and the size of the matrix particles is relatively small.

It is presumed that this phenomenon is caused by the cracking and thermal degradation of the matrix due to the repeated folding and heating. Additionally, it can be seen that the debonding between the carbon fiber reinforcing layer and the matrix may result in microscopic matrix cracking and delamination, leading to an increase in the entire thickness of the carbon-fiber-reinforced composite.

By referring to the above description, those skilled in the art will understand that the present disclosure may be embodied in other particular forms without changing the technical spirit or essential features of the present disclosure.

Therefore, it should be understood that the embodiments described hereinabove are illustrative in all aspects, but not intended to limit the present disclosure to the above-described embodiments, and the scope of the present disclosure is defined by the appended claims rather than the above-described detailed description, and in particular, it should be construed that the scope of the present disclosure covers all changes or modifications derived from the meaning and scope of the appended claims and the equivalent concept.

DETAILED DESCRIPTION OF MAIN ELEMENTS

100: Carbon-fiber-reinforced composite
10: Thermoplastic layer
20: Carbon fiber reinforcing layer
30: Stitching part
31: Upper yarn
32: Lower yarn
Θmax: Maximum folding degree
$t_{sat}$: Saturation time

The invention claimed is:
1. A carbon-fiber-reinforced composite, comprising:
a plurality of stacked thermoplastic layers; and
a plurality of carbon fiber reinforcing layers interposed between the thermoplastic layers,
wherein an uppermost layer of the carbon-fiber-reinforced composite comprises a first thermoplastic layer among the plurality of stacked thermoplastic layers,
wherein a lowermost layer of the carbon-fiber-reinforced composite comprises a second thermoplastic layer among the plurality of stacked thermoplastic layers thermoplastic layer,
wherein the carbon-fiber-reinforced composite further comprises a stitching part stitched with an upper yarn and a lower yarn from outside of the thermoplastic layers into the carbon-fiber-reinforced composite at a folding location of the carbon-fiber-reinforced composite, and wherein the carbon fiber reinforcing layers comprise a woven carbon fiber sheet and the thermoplastic layers comprise a film.

2. The carbon-fiber-reinforced composite according to claim 1, wherein the upper yarn and the lower yarn are metallic fibers.

3. The carbon-fiber-reinforced composite according to claim 2, wherein when an electric current is applied to the upper yarn and the lower yarn, the stitching part is heated and the carbon-fiber-reinforced composite is folded.

4. The carbon-fiber-reinforced composite according to claim 2, wherein the metallic fiber includes copper, aluminum, gold, silver, indium, stainless steel, nickel, carbon, carbon nano tube (CNT), or a combination thereof.

5. The carbon-fiber-reinforced composite according to claim 1, wherein the upper yarn includes aramid, glass, polyethylene, or a combination thereof, and
the lower yarn includes copper, aluminum, gold, silver, indium, stainless steel, nickel, carbon, carbon nano tube (CNT), or a combination thereof.

6. The carbon-fiber-reinforced composite according to claim 1, wherein the thermoplastic layer includes polypropylene (PP), polyethylene (PE), polyethyleneterephthalate (PET), polybutyleneterephthalate (PBT), polyamide (PA), polyacrylonitrile-butadiene-styrene copolymer (ABS), polycarbonate (PC)-ABS alloy resin, or a combination thereof.

7. The carbon-fiber-reinforced composite according to claim 1, wherein the stitching part is linearly positioned in the carbon-fiber-reinforced composite.

8. The carbon-fiber-reinforced composite according to claim 1, wherein the thermoplastic layer includes polycarbonate.

9. The carbon-fiber-reinforced composite according to claim 1, wherein the upper yarn, the lower yarn, or a combination thereof comprises two or more strands of yarn twisted together.

10. The carbon-fiber-reinforced composite according to claim 9, wherein the two or more strands of yarn are of a same type of material.

11. The carbon-fiber-reinforced composite according to claim 9, wherein the two or more strands of yarn are of different types of materials.

12. The carbon-fiber-reinforced composite according to claim 11, wherein the two or more strands of yarn comprise stainless steel and aramid.

13. The carbon-fiber-reinforced composite according to claim 9, wherein the lower yarn comprises two or more strands of yarn twisted together.

14. The carbon-fiber-reinforced composite according to claim 1,
wherein the upper yarn includes aramid, and
the lower yarn includes stainless steel and aramid.

15. The carbon-fiber-reinforced composite according to claim 1, wherein
the upper yarn is stitched from outside of the uppermost layer into the carbon-fiber-reinforced composite,
the lower yarn is stitched from outside of the lowermost layer into the carbon-fiber-reinforced composite,
the upper yarn is not present on the lowermost layer, and
the lower yarn is not present on the uppermost layer.

16. The carbon-fiber-reinforced composite according to claim 15, wherein the carbon-fiber-reinforced composite comprises an inner thermoplastic layer.

17. The carbon-fiber-reinforced composite according to claim 16, wherein each of the upper yarn and the lower yarn is present in the inner thermoplastic layer.

18. A carbon-fiber-reinforced composite, comprising:
a plurality of stacked thermoplastic layers; and
a plurality of carbon fiber reinforcing layers interposed between the thermoplastic layers,
wherein the carbon-fiber-reinforced composite further comprises a stitching part stitched with an upper yarn and a lower yarn from outside of the thermoplastic layers into the carbon-fiber-reinforced composite at a folding location of the carbon-fiber-reinforced composite,
wherein the upper yarn is stitched from outside of an uppermost layer of the carbon-fiber-reinforced composite into the carbon-fiber-reinforced composite,
wherein the lower yarn is stitched from outside of a lowermost layer of the carbon-fiber-reinforced composite into the carbon-fiber-reinforced composite,
wherein the upper yarn is not present on the lowermost layer, and
wherein the lower yarn is not present on the uppermost layer.

19. The carbon-fiber-reinforced composite according to claim 18, wherein
the carbon-fiber-reinforced composite comprises an inner thermoplastic layer, and
each of the upper yarn and the lower yarn is present in the inner thermoplastic layer.

20. The carbon-fiber-reinforced composite according to claim 19, wherein the carbon fiber reinforcing layers comprise a woven carbon fiber sheet and the thermoplastic layers comprise a film.

* * * * *